United States Patent [19]

Ziemek et al.

[11] Patent Number: 4,531,991
[45] Date of Patent: Jul. 30, 1985

[54] HEAT-INSULATING TUBING

[75] Inventors: Gerhard Ziemek, Langenhagen; Ingo H. Pahl, Hagen, both of Fed. Rep. of Germany

[73] Assignee: Kabel- und Metallwerke Gutehoffnungshuette A.G., Hanover, Fed. Rep. of Germany

[21] Appl. No.: 381,211

[22] Filed: May 24, 1982

[30] Foreign Application Priority Data

May 25, 1981 [DE] Fed. Rep. of Germany ....... 3120179
Dec. 28, 1981 [DE] Fed. Rep. of Germany ....... 3151578

[51] Int. Cl.³ .......................... B32B 5/18; B32B 31/14
[52] U.S. Cl. ...................................... 156/79; 156/247; 138/149; 138/DIG. 9; 264/45.8; 264/45.9; 264/46.3
[58] Field of Search ...................... 156/54, 56, 79, 247; 264/45.8, 45.9, 46.1, 46.3, 46.9; 138/149, DIG. 9

[56] References Cited

U.S. PATENT DOCUMENTS

| | | | |
|---|---|---|---|
| 3,459,877 | 8/1969 | Bullock et al. | 156/54 |
| 3,615,977 | 10/1971 | Lehnert et al. | 156/54 |
| 4,212,917 | 7/1980 | Skowronski et al. | 156/79 |
| 4,261,790 | 4/1981 | Brinker et al. | 156/247 |
| 4,327,121 | 4/1982 | Gray, III | 156/247 |

FOREIGN PATENT DOCUMENTS 1105422  3/1968  United Kingdom .
1277865  6/1972  United Kingdom .

OTHER PUBLICATIONS

"Pipe Insulation—as Simple as Icing a Cake", Apr. 1977, Penfold and Dean, Process Engineering, pp. 79–80.

*Primary Examiner*—Jay H. Woo
*Assistant Examiner*—Timothy W. Heitbrink
*Attorney, Agent, or Firm*—Ralf H. Siegemund

[57] ABSTRACT

A tube is thermally insulated by helically wrapping a water-repelling spacer around the tube; longitudinally folding a paper ribbon carrying a separating medium around and onto the helical spacer; injecting a foaming material into the tube as it is being formed, and permitting the material to foam inside the folded ribbon; and further permitting the foam to cure and set. Subsequently, the ribbon is peeled off the foam and, preferably, a metal or metalized foil is wrapped around the exposed foam, which is followed by the extrusion of a thermoplastic, synthetic envelope onto the foam.

11 Claims, 2 Drawing Figures

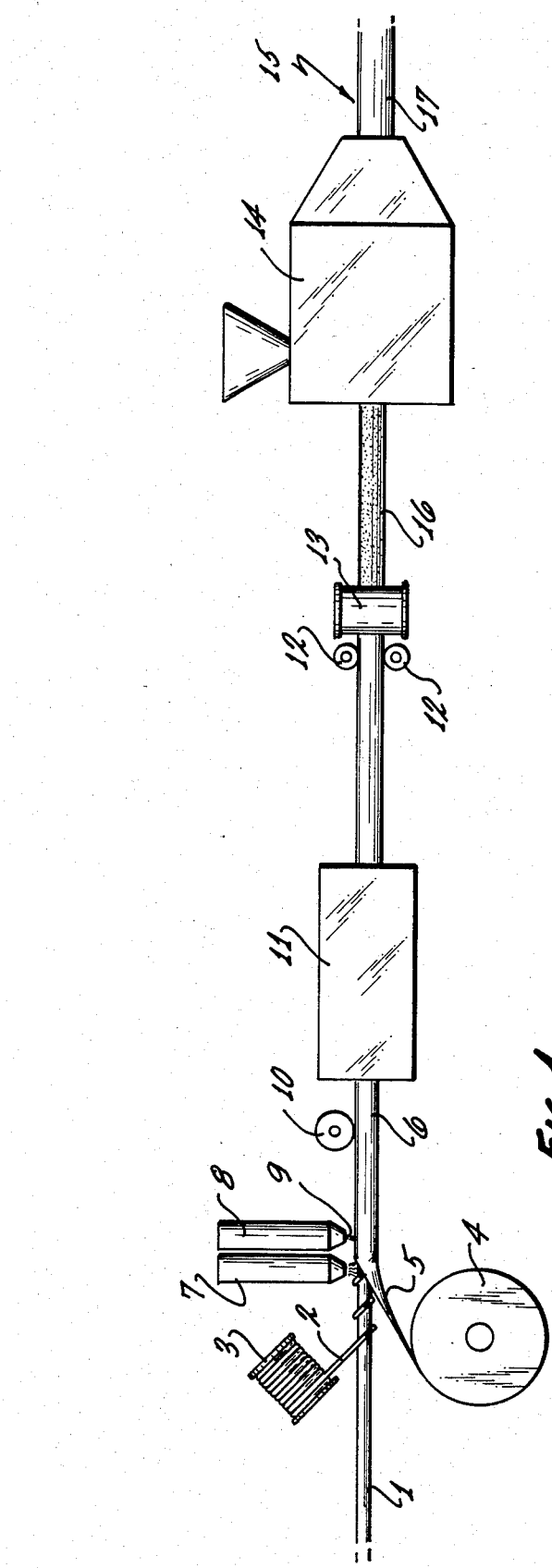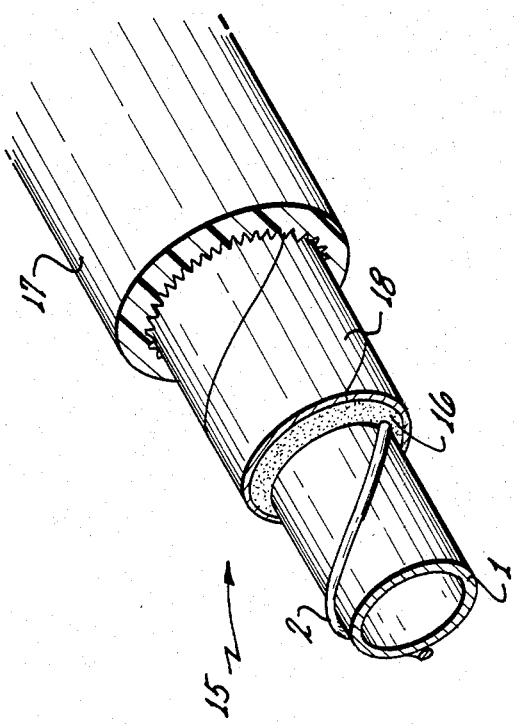

HEAT-INSULATING TUBING

BACKGROUND OF THE INVENTION

The present invention relates to the manufacture of heat-insulated tubing.

German printed patent application No. 1,960,932 suggests a method for thermally insulating metal tubing, preferably copper tubing, in which the tubing is continuously fed to a machine which will provide the thermal insulation. In a first operating step, a spacer made of paper is wrapped helically around the tubing and subsequently a ribbon is wrapped around the spacer. The ribbon, in particular, is longitudinally paid and folded around the spacer. This ribbon or tape is closed to form a closed outer tube. In the space between the inner and the outer tubing, polyurethane is injected and caused to foam which is, subsequently, cured. The foam will fill the space between the inner and outer tubing completely. It can, thus, be seen that in this particular method the outer tube constitutes a kind of mold for the foam jacket thus produced. The tape or ribbon which is formed into an outer tube is preferably made from rigid polyvinyl chloride or it is made of metal. In either case, it is desired to have this outer tube provided in a rather resisting configuration. Accordingly, this particular method has been practised for the making of rigid, i.e., nonflexible, thermally insulated tubing.

The problem existed to adapt the aforementioned method of making thermally insulated tubing so that the resulting tube is flexible. Accordingly, German printed patent application No. 2,141,475 proposed a method in which the outer tubing receives an extruded copolymer layer after the foam has been cured. Due to its adhesion to the outer tubing, the copolymer layer serves as a support for that particular outer tubing, which therefore does not have to be resistive. Rather, the outer tubing may now permit bending and the copolymer layer protects the outer tubing so that it will not tear. While technically quite feasible, this particular method now had proven to be uneconomical; the resulting tubing is too expensive.

Belgian Pat. No. 670948 discloses another method for the continuous production and manufacture of a thermally insulated tubing wherein the insulation is comprised of a foam layer. In this particular method, a metallic inner tube is provided and a split tube is formed around that inner tubing, but at a spacing therefrom and under utilization of a strip. As long as the split tube is still open, a self-foaming synthetic material can be injected which will develop foam of suitable configuration. Again, the particular split tube serves as a mold; but after the foam has cured the strip material, i.e., the split tube is removed. Therefore, this particular insulated tubing is not provided with a particular outer jacket above the foam layer. Thus, the latter layer can easily be damaged. This is particularly the case if the tubing is hauled to construction sites, stored thereat, and used under the rather rough conditions that may prevail in such an area. Moreover the foam layer may be soaked through with moisture and that, of course, reduces the insulation capability. This is particularly noticeable if the tubes are installed in still-moist rooms, under moist plaster or the like. Another disadvantage of that particular method and of the tubing made in accordance with the method is that the surface is rather rough. The surface roughness is derived from excessive deforming of the strip which must be quite strong and rather thick; since it is also necessary that the strip while serving as a mold is, in effect, sealed in order to avoid escape of foam, one has to provide the strip with overlapping edges. This, in turn, produces a rather undesirable step which contributes to the surface roughness in the surface of the foam. Also, the foaming material shoud not adhere to the inner surface of the strip as it is formed around the inner tube, and in order to avoid this adhesion it is necessary to spray the strip prior to its being folded into a split tube by means of a foam rejecting material. Unfortunately this particularly foamrejecting material will interfere with the foaming process and will, in fact, directly produce a rough surface.

The latter method has been the subject of an improvement in accordance with German printed patent application 1,704,748. In accordance with this particular patent, it has been proposed to use a foil as a ribbon or strip that is formed around the inner tubing and contains the foam, which foil remains after the process. As the assembly leaves the foam providing machine an outer jacket is established in order to provide the requisite strength. However, it was found that this particular method is not suitable for making flexible thermally insulated tubing because there is no connection or joint between the foam, the foil, and the outer jacket so that, upon flexing and bending of the tubular assembly, the foil as well as the outer wall or stratum of the foam may tear.

DESCRIPTION OF THE INVENTION

It is an object of the present invention to provide a new and improved method of making thermally insulated tubing in an economical manner, and particularly in a manner which does not impede flexing and the flexibility of the resulting product without compromising on the thermal insulation capability and permitting, particularly, the installation of such a tubing, for example, in a wet environment where there is plaster, stucco or the like.

It is a particular object of the present invention to provide a new and improved method of making thermally insulated tubing wherein initially prepared tubing, such as copper tubing, is provided with a helical spacer and wherein foaming synthetic, preferably polyurethane-based foaming material, is to be applied so that the basic thermal insulation is provided for by such a foam layer.

In accordance with the preferred embodiment of the present invention and in furtherance of carrying out the particular object, it is suggested to provide a paper ribbon or polyterephthalic acid foil as a strip or ribbon and fold the same around and on top of the helical spacer. The particular ribbon is to be provided with a separating medium, particularly on the surface which will become the interior surface of a split tube. Prior to closing the particular ribbon as a closed tube, a foaming material is injected in a manner known per se, whereupon the tube which is formed out of the strip is closed; subsequently the foam is cured and the split tube is cut open and peeled off the cured foam layer; immediately thereafter a thin outer jacket is extruded onto the bared foam layer and under utilization of a thermoplastic synthetic such as polyvinyl chloride.

It can thus be seen that the paper or foil strip is used in a manner which can also be described as a lost mold technique. The particular foil or strip is preferably deposited with a separating medium prior to its being utilized in the process described so that, particularly in the beginning of the inventive method, a paper or plastic material is present with a completely dry separating material which will not impede the foaming process after the strip tube has been closed. The particular medium will thus avoid bonding of the foam to the paper, or other material. This, however, is not essential but quite advantageous; the particular separating medium may well be sprayed onto the strip material as it is being paid for purposes of wrapping the tube around the principal tube.

The paper should have some strength and in one form of practising the invention, it may be sufficiently strong in order to take up the foaming pressure as the foaming material is injected and caused to foam. However, one may provide for a temporary support of the paper tube so that at least during foaming and curing of the foam additional support forces are provided which prevent the paper tube from tearing. The particular ribbon used for forming this outer tube should permit easy cutting and easy peeling-off of the foam layer. The synthetic jacket extruded around the foam layer will fulfill a variety of functions. First of all it will prevent ingress of moisture and penetration thereof into the pores of the thermally insulating foam. In addition, the visual appearance of the resulting tube is improved. Another feature is to be seen in the protection the outer layer is to provide against damage of the foam.

The foam is preferably flexible closed-pore type foam on the basis of polyurethane or polyisocyanurate. Depending upon the dimensions of the helical spacer which is wrapped around the copper tube, the thickness of the foam layer should be between two and ten millimeters, preferably between two and seven millimeters depending upon the outer diameter of the copper tubing which is usually in the range of 15 to 22 millimeters. This kind of a dimension is a result of optimizing a compromise between the desired thermal insulative properties, on one hand, and the flexibility of the tubular assembly, on the other hand. It was found to be of advantage to use as a spacer just a regular cord, which is impregnated by a water repellant material. This feature, in conjunction with the aforementioned feature, such as a relatively thin foam layer and a relatively thin outer jacket, and still taken in conjunction with a rather cheap paper for temporarily wrapping the tubing and the foam, leads to a very economic configuration and a very inexpensive thermally insulated tube.

The ribbon, such as a paper ribbon, should have overlapping edges as it is formed into a tube and the overlapping edges should be bonded to each other. One will use, preferably, a so-called hot melting adhesive, which is applied in form of a thread or the like, onto edges after which the edges are forced against each other.

For reasons which will be developed more fully below, it is of advantage to provide the outer jacket in a configuration with radially inwardly extending ribs, for providing additional support of the form layer underneath which is of particular importance in case post-blowing occurs in the foaming material.

It is of advantage to wrap a metal foil or a metalized synthetic foil helically around the exposed foam layer, i.e., after the paper has been peeled off but prior to extruding the protective jacket around the assembly. This foil provides protection and it serves additionally as a protection against radiation that results from the extrusion process.

With these and other objects in view, the invention consists in the construction, arrangement, and combination of the various parts of the device, whereby the objects comtemplated are attained as hereinafter set forth, pointed out in the appended claims, and illustrated in the accompanying drawings.

DESCRIPTION OF THE DRAWINGS

FIG. 1 is a schematic representation of equipment for practicing the preferred embodiment of the invention in accordance with the best mode thereof; and FIG. 2 is a perspective section view through tubing made in accordance with the method explained with reference to FIG. 1, sequentially provided layers being partially removed in order to facilitate illustration.

Proceeding now to the detailed description of the drawings, FIG. 1 illustrates soft annealed copper tubing 1 which is being paid from a suitable store or which has just been made and leaves the processing equipment for the manufacture of such tubing. The particular tubing may, for example, have an outer diameter of 18 millimeter and a wall thickness of 1 millimeter.

Reference numeral 3 refers to a supply spool 3 from which a cord 2 is run towards the tubing 1 in an oblique direction. As the cord 2 is paid from the spool 3 towards the running tubing 1, a helical spacer is formed around the copper tubing. The particular spacer cord 2 may be made of suitable material such as paper. The cord is impregnated with bitumen or wax for repelling water.

A paper ribbon 5 is paid from a suitable spool 4 and is run longitudinally towards the tubing 1 with helical spacer, and the ribbon 5 is formed into a stiff tube around that spacer. Just ahead of the approach point for the edges of the ribbon 5, a foam gun 7 is provided which injects a foamable blend of synthetic material into the interior of the tube 6 as it is being formed. In particular, this synthetic blend is sprayed onto the ribbon 5 as it is being folded into a tube 6. The basic component of the synthetic blend should be polyurethane, but polyisocyanurate can be used as well.

A store 8 pays a thin thread or the like, 9, of a hot melting adhesive and deposits it upon the now adjoining edges of the ribbon 5, which will be bonded to each other, as a pressure roller 10 urges the strip material into adhesive contact with each other. The result is the paper tube 6 as a closed mold.

Upon depositing, i.e., spraying a synthetic blend upon the paper ribbon 5, the reaction of the foam components begins and soon the foam will fill the space between the copper tube 1 and the paper tube 6. If the paper used for ribbon 5 does not have a particularly high strength, the coaxial assembly should pass through a support tube 11 which bears against the paper tube 6 from the outside in order to take up the pressure that results from the foaming process. It is, furthermore, assumed that the foam material cures at least partially inside of the tube 11 and more so when leaving that tube.

Following the curing, the paper is to be removed from the foam layer underneath. For this the assembly passes through a cutting station which includes, for example, two rotary cutters 12 for cutting the paper tube 6 in opposite points. The paper is removed in that it is being peeled off and wound onto spools 13, arranged on opposite sides of the assembly passing through. Subsequently, this paper is shredded or processed otherwise. Therefore, the device leaving the cutting station is comprised of the copper tubing 1, the spacer 2 and a now exposed foam layer 16. This assembly passes through an extruder 15 in which a very thin thermoplastic outer jacket is extruded onto the foam 16 in order to provide a jacketed tube 15. The thermoplastic material used for this purpose may, for example, be polyvinyl chloride.

In order to facilitate the peel off of the paper behind the cutting station 12, the paper 5 carries a separating medium 1, such as oil or wax, on the side which will become the inside surface of the tube 6. In furtherance of the invention, it is suggested to provide the jacket 17 in a configuration which includes radially inwardly directed ribs of the triangular cross section, the apices of which bear against the foam layer 16. This way the contact with the foam layer is minimized.

It should be mentioned that the outer synthetic layer designated by reference numeral 17 could be replaced by a fairly thin layer, however, the particular configuration with radially inwardly extending ribs has the following advantage and serves the following purpose.

It will be realized that in general, in a method in accordance with the invention, the extrusion process amounts to the application of additional heat to the assembly, and this heat, of course, is to some extent effective on and in the foam layer being provided with this extruded jacket. As a consequence, a post-foaming or some local blowing and bubbling process may occur in the foam which is not immediately detrimetnal as far as the thermal insulative properties is concerned, but it may locally deform the surface of the tube and may even provide a local mechanical weak spot, and it will also interfere with the appearance of the tube. The particular configuration of the jacket 17 now serves as an impediment of such local deformation. The ribs bear regularly, and in rather closely spaced distances against the surface of the foam layer 16. The ribs, in fact, support the foam layer as far as its cylindrical configuration is concerned. The spacing between the ribs minimize the application and migration of heat from the hot extruded material into the foam layer. The area of contact between the hot extruded material and the foam material is basically limited to lines formed by the peaks or apices of the ribs.

It should be mentioned that between the cutting station 12 and the extruder 14, one may provide a station which wraps a foil 18 (FIG. 2) around the exposed polyurethane foam layer 16. If this particular foil is very thin and if it is provided in a helical fashion, the flexibility of the resulting tube is hardly interfered with because the overlapping layers or loops of the foil can readily slide in relation to each other when the tubular assembly is flexed, and this feature offers practically no resistance against the bending or flexing process. Such a helical wrapping is to be distinguished from a longitudinal paid foil which would readily tear where subjected to tension, and where subjected to compression it would wrinkle.

The foil 18 may particularly be provided as a metal or as a metalized synthetic foil, and in order to enhance its flexibility, particularly when becoming part of the tubular assembly as described, it may be provided with some form of corrugation. The ribbon layer 18 interposed between the foam and the extruded jacket is an additional protection whereby in particular the metallized material will prevent the radiation from the hot extrudite from reaching the foam material. The foil 18 is helically wrapped around the foam layer prior to the extrusion and is made of metal or metalized synthetic and it serves as a protection against radiation from the hot extruded material as it is being applied to the assembly. In addition, this foil serves as a barrier against the migration of plasticizer material from the thermoplastic jacket 17 onto the foam material. Moreover, the metal of this particular foil is very advantageous in distributing any residual heat that migrates from the ribs of the layer 17 in radially inward direction. The rather high degree of thermal conductivity spreads this small amount of heat in a circumferential direction so that on one hand there are not hot spots developed in the foam, but on the other hand, the small amount of heat is evenly distributed around the foam.

The ribs of layer 17 form a kind of arch support for the particular foam layer and the space between the ribs is filled with air which provides particularly useful thermal insulation between the hot extrudite and the foam material. Thus the layer 17 does not only provide mechanical support against the local deformation of overheated foam but the application and process and the configuration of that particular thermoplastic layer that the migration of heat into the foam in minimized and the post blowing or post foaming phenomenon will not occur, or will occur only to a minimal extent. In addition, of course, it will be realized that the particular configuration of the jacket 17 adds to the thermal insulative features and characteristics of the tubular assembly as a whole whereby the arch-shaped configuration and the spacings between the ribs are particularly useful. Another aspect of the ribbing to be seen that it permits on one hand this particular protective layer to be rather thick while on the other hand it does not impede flexibility of the tubular assembly as a whole. It will, therefore, follow bending rather easily, whereby any bending area of the ribs is subjected to compression as well as the tension, which balance locally resulting in a more desirable flexibility as compared with a massive extruded outer jacket.

The heat and thermally insulated tubing as made in accordance with the above described inventive method is quite flexible, and even when bent and flexed significantly, the several layers will not tear. The outer jacket 17 made out of thermoplastic material also provides the resulting tubing with a visually acceptable appearance. Moreover, the relative weight or weight per unit length of the tube is quite advantageous and the low thermal conductivity of the polyurethane based foam provides a high resistance against the flow of thermal energy into or out of the tubing as the case requires.

The invention is not limited to the embodiments described above, but all changes and modifications thereof, not constituting departures from the spirit and scope of the invention, are intended to be included.

We claim:

1. A method of thermally insulating a tube, comprising the steps of:
   helically wrapping a spacer around the tube;
   longitudinally folding a ribbon carrying a separating medium around and onto the helical spacer;
   closing the ribbon along its edges to establish a closed tubular mold;
   injecting a foaming material into the tube as it is being formed prior to closing, and permitting the material to foam inside the folded ribbon and tubular mold, and further permitting the foam to cure and set;
   cutting and peeling the ribbon off the foam; and
   extruding a thermoplastic, synthetic envelope onto the foam.

2. The method as in claim 1, wherein the wrapping step is carried out by means of a cord being impregnated with a water-repelling substance.

3. The method as in claim 1, wherein the folding step is carried out by means of a paper strip whose edges are made to overlap, said closing step including bonding the overlapping edges together.

4. The method as in claim 1, including the step of wrapping a metal foil or metallized synthetic foil around the foam in overlapping turns, subsequent to peeling and prior to extruding.

5. The method as in claim 1 or 4, wherein the extruding step includes extruding a jacket with inwardly directed ribs of triangular cross section.

6. The method as in claim 1, wherein the ribbon is comprised of polyterephthalic acid ester.

7. The method as in claim 1, wherein the thermoplastic synthetic is polyvinyl chloride.

8. The method as in claim 1, wherein the spacer has a thickness in the range of from two to ten millimeters.

9. The method as in claim 2, wherein the water-repellent substance is wax or bitumen.

10. The method as in claim 1, wherein the foaming material is a polyurethane or polycyanurate.

11. The method as in claim 3, wherein the bonding step includes applying a string of hot melting adhesive.

* * * * *